US011412343B2

(12) United States Patent
Kumar et al.

(10) Patent No.: US 11,412,343 B2
(45) Date of Patent: Aug. 9, 2022

(54) GEO-HASHING FOR PROXIMITY COMPUTATION IN A STREAM OF A DISTRIBUTED SYSTEM

(71) Applicant: Oracle International Corporation, Redwood Shores, CA (US)

(72) Inventors: Santosh Kumar, Bangalore (IN); Santosh Kumar Singh, New Delhi (IN); Prithviraj Singh, Bangalore (IN); Rahul Gupta, Bangalore (IN); Yathish Gatty, Bangalore (IN); Hanumesh Thippanna Govindappa, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 535 days.

(21) Appl. No.: 16/123,973

(22) Filed: Sep. 6, 2018

(65) Prior Publication Data

US 2019/0102387 A1 Apr. 4, 2019

(30) Foreign Application Priority Data

Sep. 30, 2017 (IN) .............................. 201741034830

(51) Int. Cl.
*H04W 4/021* (2018.01)
*H04W 4/02* (2018.01)
(Continued)

(52) U.S. Cl.
CPC ............ *H04W 4/021* (2013.01); *G06F 9/542* (2013.01); *G06F 16/215* (2019.01);
(Continued)

(58) Field of Classification Search
None
See application file for complete search history.

(56) References Cited

U.S. PATENT DOCUMENTS 6,218,961 B1   4/2001   Gross et al.
6,833,811 B2   12/2004  Zeitfuss et al.
(Continued)

FOREIGN PATENT DOCUMENTS

CN   104792337   7/2015
WO   2017135837  8/2017

OTHER PUBLICATIONS

U.S. Appl. No. 16/124,014, "Notice of Allowance", dated Oct. 24, 2018, 13 pages.
(Continued)

*Primary Examiner* — Chat C Do
*Assistant Examiner* — William C Wood
(74) *Attorney, Agent, or Firm* — Kilpatrick Townsend & Stockton LLP

(57) ABSTRACT

An event processing system for distributing a geospatial computation, and processing events in an event stream, is disclosed. The disclosed system and methods can apply a spatial function, such as distance, within Distance, and proximity, in parallel to a stream comprising event locations. The disclosed system improves over existing geospatial computations by providing an efficient parallel implementation that can handle a large number of moving objects in real time with little latency. A computing device receives an event stream comprising locations and can geohash the locations to obtain geohashes identifying geo grid cells containing the locations. The computing device can determine respective sets of neighboring geohashes identifying neighboring cells in the geo grid. The computing device then partitions the geospatial computation by mapping, based on the respective geo hash and the respective set of neighboring geo hashes, the events to processors.

17 Claims, 8 Drawing Sheets

(51) Int. Cl.

| | | |
|---|---|---|
| *G06F 9/54* | (2006.01) | |
| *G06F 16/29* | (2019.01) | |
| *G06F 16/22* | (2019.01) | |
| *H04L 67/10* | (2022.01) | |
| *H04L 67/52* | (2022.01) | |
| *G06F 16/215* | (2019.01) | |
| *G06F 16/2455* | (2019.01) | |
| *G06F 16/9535* | (2019.01) | |
| *G06F 16/9537* | (2019.01) | |
| *G06F 16/248* | (2019.01) | |

(52) U.S. Cl.
CPC ...... *G06F 16/2237* (2019.01); *G06F 16/2255* (2019.01); *G06F 16/248* (2019.01); *G06F 16/24554* (2019.01); *G06F 16/29* (2019.01); *G06F 16/9535* (2019.01); *G06F 16/9537* (2019.01); *H04L 67/10* (2013.01); *H04L 67/52* (2022.05); *H04W 4/023* (2013.01)

(56) References Cited

U.S. PATENT DOCUMENTS

| | | | |
|---|---|---|---|
| 7,164,986 | B2 | 1/2007 | Humphries et al. |
| 7,961,631 | B2 | 6/2011 | Chen et al. |
| 8,099,452 | B2 | 1/2012 | Chkodrov et al. |
| 8,463,487 | B2 | 6/2013 | Nielsen et al. |
| 9,137,636 | B2 | 9/2015 | Sheha et al. |
| 9,207,679 | B1 | 12/2015 | Chatham |
| 9,262,479 | B2 | 2/2016 | Deshmukh et al. |
| 9,286,354 | B2 | 3/2016 | Cammert et al. |
| 9,319,471 | B2 | 4/2016 | Diem |
| 9,408,034 | B2 | 8/2016 | Zhu |
| 9,477,537 | B2 | 10/2016 | Dyer et al. |
| 9,495,783 | B1 | 11/2016 | Samarasekera et al. |
| 9,535,761 | B2 | 1/2017 | Park et al. |
| 9,571,968 | B1 | 2/2017 | Barron et al. |
| 9,584,977 | B2 | 2/2017 | Yamamoto |
| 9,671,232 | B2 | 6/2017 | Nandan |
| 9,804,892 | B2 | 10/2017 | Park et al. |
| 2010/0185984 | A1* | 7/2010 | Wright .................. G06F 16/29 715/833 |
| 2011/0250875 | A1 | 10/2011 | Huang et al. |
| 2012/0291049 | A1* | 11/2012 | Park .................. G06F 16/2237 719/318 |
| 2013/0166601 | A1* | 6/2013 | Chrapko ............. G06F 16/9024 707/798 |
| 2013/0191370 | A1 | 7/2013 | Chen et al. |
| 2014/0357299 | A1 | 12/2014 | Xu et al. |
| 2015/0095333 | A1* | 4/2015 | Porpora ............ G06F 16/24568 707/737 |
| 2015/0289091 | A1* | 10/2015 | Lv .......................... H04W 4/02 455/456.1 |
| 2016/0283554 | A1 | 9/2016 | Ray et al. |
| 2016/0377438 | A1 | 12/2016 | Kim et al. |
| 2017/0162053 | A1 | 6/2017 | Margalef Valldeperez et al. |
| 2017/0178117 | A1 | 6/2017 | Mcclard et al. |
| 2017/0230791 | A1 | 8/2017 | Jones |
| 2017/0316033 | A1 | 11/2017 | Rishe |
| 2017/0372612 | A1 | 12/2017 | Bai et al. |
| 2018/0006993 | A1* | 1/2018 | Jazayeri .................. H04W 4/06 |
| 2018/0075109 | A1 | 3/2018 | Park et al. |

OTHER PUBLICATIONS

Region Monitoring and iBeacon, Available online at: https://developer.apple.com/library/content/documentation/UserExperience/Conceptual/LocationAwarenessPG/RegionMonitoring/RegionMonitoring.html, Mar. 21, 2016, 2 pages.

Chandrashekar, Announcing real-time Geospatial Analytics in Azure Stream Analytics, Mar. 1, 2017, 4 pages.

Combaneyre, Location Analytics: Minority Report is Here—Real-Time Geofencing Using SAS® Event Stream Processing, Paper SAS395-2017, Available online at: http://support.sas.com/resources/papers/proceedings17/SAS0395-2017.pdf, 2017, pp. 1-10.

Guo et al., Location-Aware Pub/Sub System: When Continuous Moving Queries Meet Dynamic Event Streams, Available on Internet at: http://www.nextcenter.org/wp-content/uploads/2017/08/Location-Aware-Pub-Sub-System-When-Continuous-Moving-Queries-Meet-Dynamic-Event-Streams.pdf, May-Jun. 2015, 15 pages.

Hastings et al., A Scalable Technique for Large Scale, Real-Time Range Monitoring of Heterogeneous Clients, 3rd International Conference on Testbeds and Research Infrastructure for the Development of Networks and Communities, 2007, pp. 1-6.

Hong et al., A Grid-Based Node Split Algorithm for Managing Current Location Data of Moving Objects, The Journal of Supercomputing, vol. 42, Issue 3, Dec. 2007, pp. 321-337.

Park, Location-Based Grid-Index for Spatial Query Processing, Expert Systems with Applications, vol. 41, Issue 4, Part 1, Mar. 2014, pp. 1294-1300.

Patroumpas et al., Managing Trajectories of Moving Objects as Data Streams, Proceedings of the Second Workshop on Spatio-Temporal Database Management (STDBM'04), Aug. 30, 2004, pp. 41-48.

Lane Position and Vehicle-to-Vehicle Measurement, RT-Range Oxford Technical Solutions Ltd., 2017, pp. 1-156.

Shields, RT-Range Measurements, OxTS Support, Available online at: https://support.oxts.com/hc/en-us/articles/115002772345-RT-Range-Measurements, Feb. 7, 2018, pp. 1-12.

Siksnys et al., A Location Privacy Aware Friend Locator, Advances in Spatial and Temporal Databases, 11th International Symposium, Jul. 8-10, 2009, pp. 405-410.

Stubbs et al., A Real-Time Collision Warning System for Intersections, Available online at: https://pdfs.semanticscholar.org/9695/97d93a41c4a377adf5fb22276218f6e62015.pdf, 2018, pp. 1-16.

Zhang et al., Continuous Intersection Joins Over Moving Objects, Available on Internet at: https://pdfs.semanticscholar.org/5679/fc04db63a7f422ce350207058dc494cf9d4a.pdf, Apr. 2008, 10 pages.

\* cited by examiner

GEO-HASHING FOR PROXIMITY COMPUTATION IN A STREAM OF A DISTRIBUTED SYSTEM

CROSS-REFERENCE TO RELATED APPLICATION

The present application is a non-provisional of India Application No. 201741034830, filed Sep. 30, 2017, the entire contents of which is herein incorporated by reference for all purposes. This application is also related to U.S. Non-Provisional Application Ser. No. 16/124,014, filed Sep. 6, 2018, now U.S. Pat. No. 10,231,085, entitled "SCALING OUT MOVING OBJECTS FOR GEO-FENCE PROXIMITY DETERMINATION," the entire contents of which is also incorporated herein by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for distributing a geospatial computation and processing events of an event stream.

In an embodiment, a computing device receives a plurality of events, the events comprising location information. The computing device hashes the location information of the events to obtain geo hashes identifying cells in a geo grid, a respective identified cell containing respective location information of a respective event. The computing device then determines, for a respective geo hash that identifies the respective cell containing the respective location information, a respective set of neighboring geo hashes identifying neighboring cells in the geo grid. The computing device then partitions the plurality of events by mapping, based on the respective geo hash and the respective set of neighboring geo hashes, the respective event to a respective processor of a plurality of distributed processors. The computing device then receives an output result from the respective processor identifying a respective partition result of the geospatial computation. The computing device then combines the respective partition result with a second partition result to obtain a single result corresponding to the geospatial computation. The computing device then outputs the single result corresponding to the geospatial computation for a user.

In a variation on this embodiment, the respective partition result of the geospatial computation corresponds to a partition application of a spatial function to process input comprising the respective location information and second location information of a second event.

In a variation on this embodiment, the spatial function returns a proximity of the respective location information and the second location information.

In a variation on this embodiment, the computing device further obtains a cutoff distance for applications of the spatial function. The computing device then determines a size of the cells in the geo grid, based at least in part on the obtained cutoff distance. The computing device then spaces the geo grid based at least in part on the determined size.

In a variation on this embodiment, while partitioning the plurality of events, the computing device further partitions the geo grid by assigning a first set of geo hashes identifying a first set of cells in the geo grid to the respective processor. In accordance with a determination that the respective geo hash and/or a second geo hash in the respective set of neighboring geo hashes matches the first set of geo hashes, the computing device then sends the respective event to the respective processor.

In a variation on this embodiment, in accordance with a determination by the respective processor that the second geo hash matches the first set of geo hashes, the partition result of the geospatial computation is computed, by the respective processor, as an application of a spatial function on input comprising the respective geo hash and the second geo hash. In accordance with a determination by the respective processor that the second geo hash does not match the first set of geo hashes, the partition result of the geospatial computation is not computed as the application of the spatial function on the input comprising the respective geo hash and the second geo hash.

In a variation on this embodiment, the respective set of neighboring geo hashes comprises eight geo hashes identifying cells adjacent to the respective cell.

In a variation on this embodiment, combining the respective partition result with the second partition result further comprises filtering out a duplicate result of the respective partition result and the second partition result.

Some, any, or all of the above features may be implemented as a method, system, or computer-readable storage medium. The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1A:
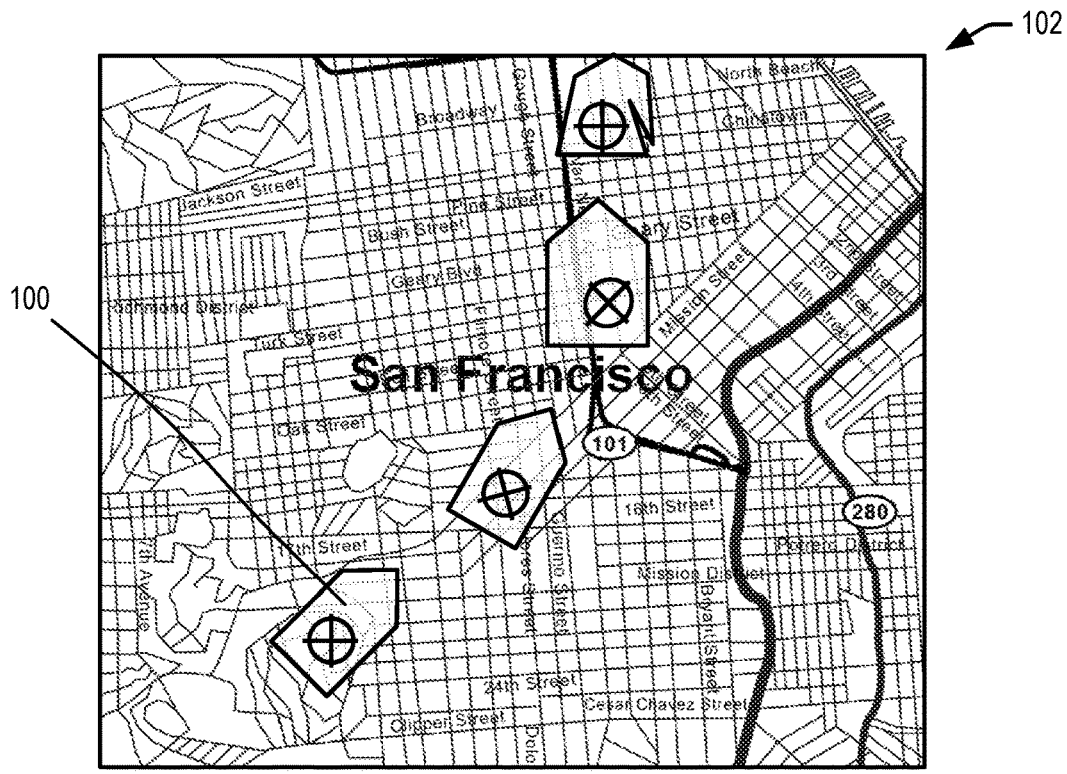
FIG. 1A illustrates an example of a moving object producing location stream events.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principal source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context) wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Real Time Streaming & Event Processing Analytics

With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The Oracle Stream Analytics platform delivers on Fast Data with responsiveness. Oracle Edge Analytics pushes processing to the network edge, correlating, filtering and analyzing data for actionable insight in real-time.

The Oracle Stream Analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the Oracle Stream Analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The Oracle Stream Analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the Oracle Stream Analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The Oracle Stream Analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

The techniques described above and below may be implemented in a number of ways and in a number of contexts. Several example implementations and contexts are provided with reference to the following figures, as described below in more detail. However, the following implementations and contexts are but a few of many.

Oracle Stream Analytics Architecture

Embodiments of the present disclosure provide techniques for receiving and processing data streaming from an event source. In various embodiments, the Oracle Stream Analytics system comprises a Stream Analytics server, Stream Analytics Visualizer, a command-line administrative interface, and an Integrated Development Environment (IDE). The Stream Analytics server hosts logically related resources and services for running Stream Analytics applications. Servers may be grouped into and managed as domains. A domain can have one server (standalone-server domain) or many (multiserver domain). The Stream Analytics' domains and servers may be managed through the Stream Analytics Visualizer and the command-line administrative interface. In some embodiments, the Stream Analytics Visualizer is a web-based user interface through which Stream Analytics applications running on the Stream Analytics server are deployed, configured, tested, and monitored. In some embodiments, the command-line administrative interface enables a user to manage the server from the command line and through configuration files. For example, the user may start and stop domains and deploy, suspend, resume, and uninstall an applications. Advantageously, the Oracle Stream Analytics system is developed to simplify the complex event processing operations and make them available even to users without any technical background.

The Oracle Stream Analytics system adopts multi-layer software architecture. The Java Virtual Machine (JVM) provides most fundamental support at the lowest level. Above that is the OSGi framework, which manages the Java packages between software modules and deals with class versioning and loading. Spring Dynamic Modules lies above the OSGi framework, which is responsible for service instantiation and dependency injection. Above that comes the Oracle Stream Analytics server modules layer. This layer provides the core Oracle Stream Analytics functionality, including the CQL engine, server management and input/output data handling. The highest level in the architecture is the application layer.

A typical data flow through an Oracle Stream Analytics application starts from incoming event data streams. The data is converted and used by an adapter to create event objects that can be obtained by any component that registered to listen to the adapter. A channel is one of those components that can listen to adapters. Data goes through the channel all the way to the CQL processor component, which is able to efficiently process data using the query language (CQL). The output can be sent to downstream listeners.

Geospatial Computations on Location Event Streams

Embodiments of the present disclosure provide techniques for distributing a geospatial computation, and processing events in an event stream. In particular, the disclosed system and methods can apply a spatial function, such as distance, withinDistance, and proximity, in parallel to a stream comprising event locations. The disclosed system can improve over existing geospatial computations by providing an efficient parallel implementation that can perform geospatial computations on a very large, and potentially unlimited, number of moving objects in real time with little latency.

FIG. 1A illustrates an example of a moving object producing location stream events. In this example, a moving vehicle 100 is represented as an object on a map 102. As vehicle 100 moves, it can provide streaming data to a server by a cellular or wireless internet connection, a satellite link, etc. For example, the stream could include timestamped events such as a GPS location, a planned course, traffic information, a speed and direction of motion, changes of course or speed, etc. In some embodiments, the server can receive stream events corresponding to multiple moving objects, e.g., vehicles. The server and/or nodes in a computing cluster can subsequently process the received stream events in order to compute a continuous query, such as a CQL query.

The continuous query can include a spatial function. For example, when the stream includes events from multiple moving objects, the continuous query could include a spatial function of the objects' relative positions such as distance, withinDistance, and/or proximity. In another example, the spatial function could depend on the objects' relative motion, or could determine if the objects' paths are likely to intersect. In some embodiments, the system obtains a cutoff distance for the application of the spatial function, and only computes the spatial function for events within this distance from each other. For example, the system may obtain the cutoff distance as a user-defined parameter.

Figure 1B:
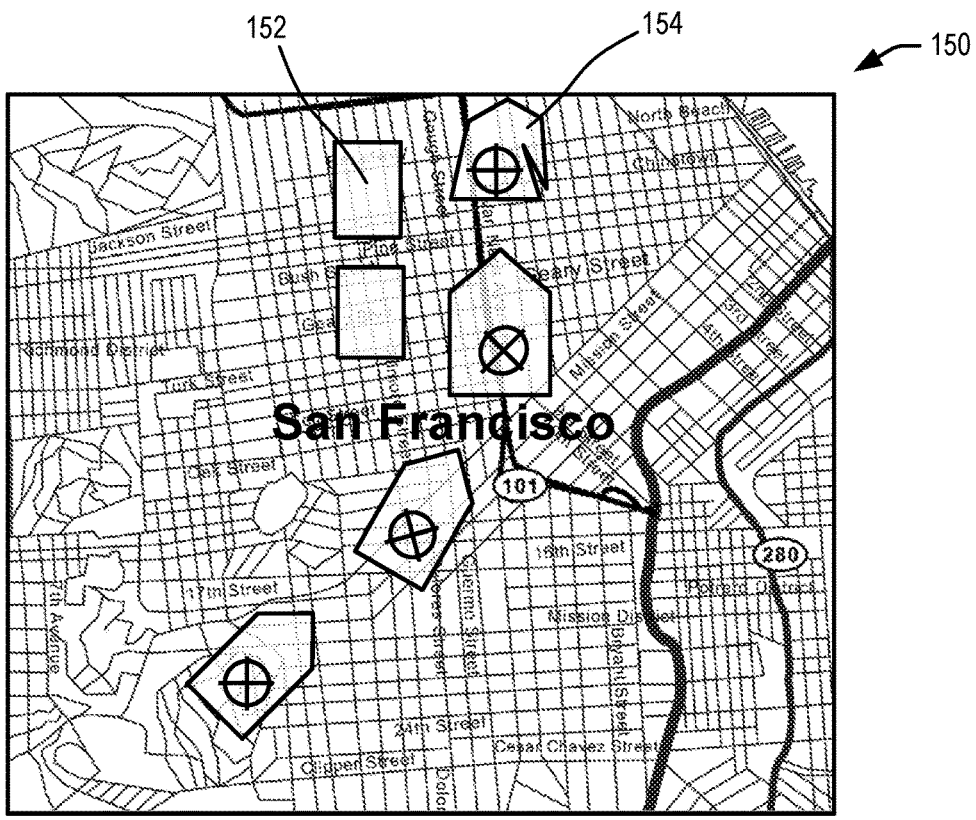
FIG. 1B illustrates an example of a spatial function between moving objects.

FIG. 1B illustrates an example of a spatial function between moving objects. In this example, vehicle 152 and vehicle 154 are represented as objects on map 150. A server can receive stream events corresponding to the positions of vehicle 152 and vehicle 154 at a plurality of times.

In an embodiment, the stream processing system receives events of many moving objects, so the total number of events that it receives at any time t and/or over time can be very large. In order to compute a spatial function, such as proximity, of all the nearby moving objects in real time, it is desirable to be able to make use of sufficient computing power. Accordingly, these events should be partitioned efficiently across multiple processing nodes for parallel computation.

An important condition on this partitioning is that it should distribute all nearby events within the same partition, so as to minimize communication between nodes or cores. If the system fails to partition all the relevant events together, it will potentially miss the spatial function computation on a number of nearby event pairs, which can lead to inaccurate or incomplete results. In embodiments, the disclosed system and methods can make use of a geo grid, e.g. by geocoding or geohashing, to partition the input events efficiently based on the location field of the events, as described in detail below.

Figure 2:
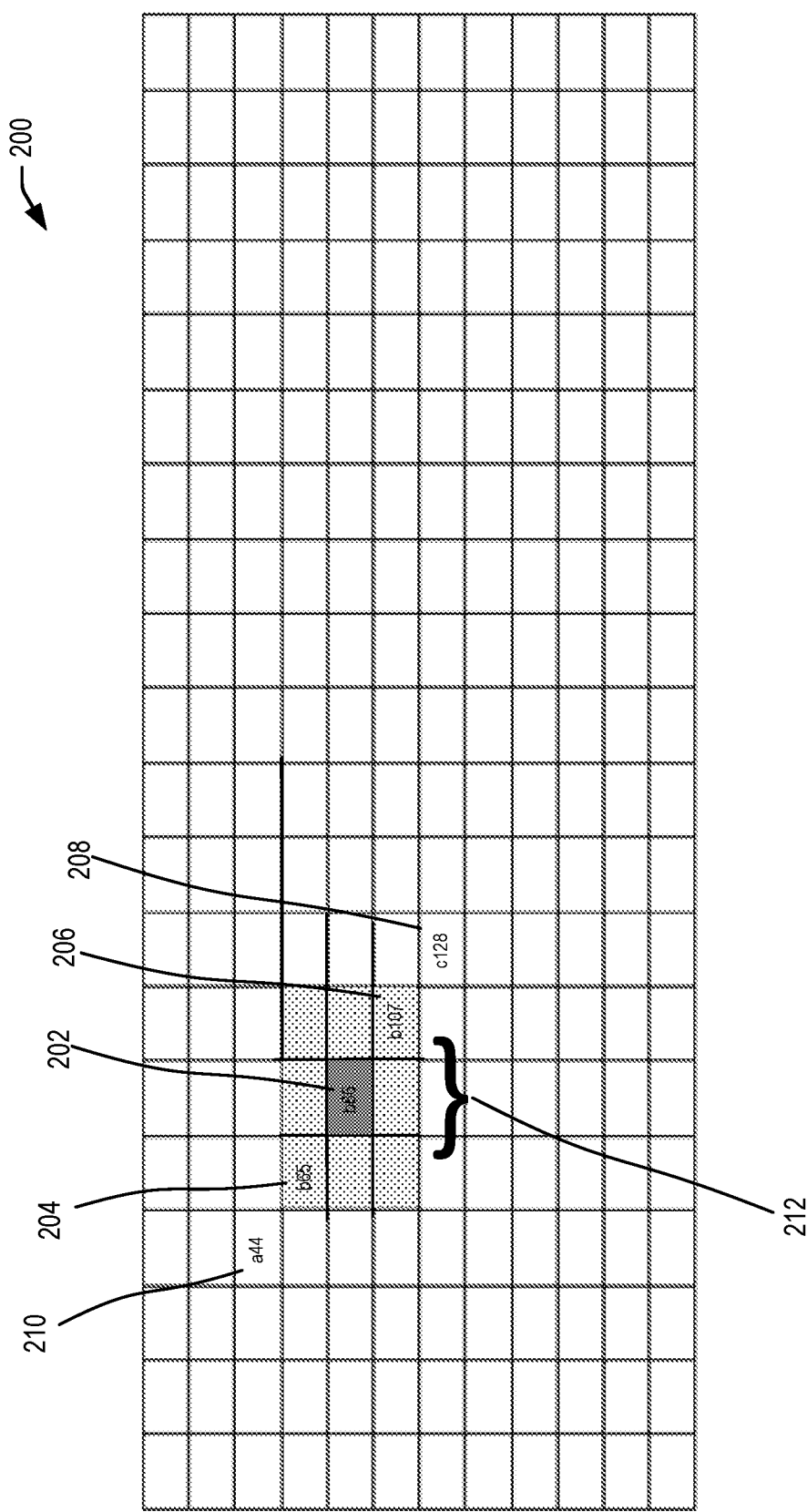
FIG. 2 illustrates an example geo grid with grid numbers, according to an embodiment.

Using Geo-Hashing for Scale Out During Proximity Computation of Moving Objects in a Stream and on a Distributed System FIG. 2 illustrates an example geo grid 200 with grid numbers, according to an embodiment. In an embodiment, a geocoding or geohashing scheme can be used to map event locations to grid cells in geo grid 200. In this example, a full-length geocode or geohash identifies a single grid cell, such as grid cell 202, shown with dark hatching. Grid cell 202 is identified by the geohash identifier "b86." Likewise, a shorter prefix of the geohash expands to a group of grid cells nearby to grid cell 202, such as grid cells 204 and 206, shown with lighter hatching. Note that grid cells 204 and 206 are identified by the geohash identifiers "b65" and "b107," respectively, and thus share the prefix "b" with grid cell 202. As shown, grid cell 208 with geohash identifier "c128" and grid cell 210 with geohash identifier "a44" are located moderately farther from grid cell 202, and accordingly have different geohash prefixes.

The grid cells of the geo grid can have a shape, such as square, and a typical size, such as the edge length of the square. The boundaries of the grid cells can be based on a spatial reference system (SRS), such as latitude and longitude. In an embodiment, the system can determine the size of the grid cells based on a cutoff distance, e.g. defined by a user, for the application of the spatial function. In a typical example, the grid cell size may equal the cutoff distance. As a result, if the system only computes the spatial function between events that are located within the same cell on the grid, or in nearest neighbor cells or next-nearest neighbor cells, then it avoids the computation for events that are beyond the cutoff distance from each other.

For each received event, the system can map the event's location to a grid cell identified by a geo hash. The system can also find a set of nearby grid cells for each event. For example, in a two-dimensional map divided into a square grid such as geo grid 200, the system can identify eight adjacent grid cells 212 to grid cell 202. In particular, the system can identify adjacent cells when the cell size has been determined based on the cutoff distance, e.g., when the cell size has been set equal to the cutoff distance. In some embodiments, the system can identify a different set of nearby cells, and is not limited by the present disclosure. For example, the system could identify next-nearest neighbor cells, such as the eight grid cells 212 plus all the grid cells adjacent to them.

Thus, each event received at a time t=T0 can be associated with a grid cell identified by a geohash, as shown in Table 1. In addition, the system identifies a group of adjacent or nearby geohashes, also shown in Table 1. In an embodiment, the system can process events of a grid cell and its adjacent grid cells within the same partition, thereby ensuring that the spatial function can be computed for all the nearby pairs of grid cells, while minimizing the communication needed between nodes.

TABLE 1

Map of events to grid geohashes and adjacent grid geohashes

| Time | Event ID | Grid geohash | Adjacent grid geohashes |
|------|----------|--------------|-------------------------|
| T0 | E1 | b86 | b65, b66, b67, b85, b87, b105, b106, b107 |
| T0 | E2 | b86 | b65, b66, b67, b85, b87, b105, b106, b107 |
| T0 | E3 | b65 | a44, a45, a46, b64, b66, b84, b85, b86 |
| T0 | E4 | c128 | b107, b108, b109, c127, c129, c147, c148, c149 |

Since typically the number of processing nodes is less than the total number of grid cells in the geo grid, the system can partition the full geo grid among the available processing nodes, i.e. determine groups or ranges of grid cells belonging to each partition. The system can then assign the partitioned group or range of grid cells to each processing node, as shown in Table 2.

TABLE 2

Map of grid geohashes to processing nodes

| Grid geohashes | Processing node |
|----------------|-----------------|
| a1 to a60, b61 to b100 | 1 |
| b101 to b120, c121 to c180, d181 to d200 | 2 |
| d201 to d240, e241 to e300 | 3 |
| f301 to f360, f361 to f400 | 4 |

Next, the system can partition the input stream, making use of the mapping of events to grid cell geohashes, as in the example of Table 1, and the mapping of grid geohash ranges to parallel-computing partitions as in Table 2. In particular, the system can assign each received event to one or more processing nodes, as shown in Table 3. In this example, if either the grid cell of an event's location or an adjacent grid cell is partitioned to a node, the event is assigned to that node.

For example, both events E1 and E2 are located at the grid cell with geohash "b86," as shown in Table 1. Consequently, both events have the same set of adjacent grid cell geohashes. In the example of Table 2, geohash "b86" and most of its nearby geohashes are partitioned to processing node 1, while the higher end of the range of nearby geohashes (i.e., "b105," "b106," and "b107") are partitioned to processing node 2. As a result, in the example of Table 3, both events E1 and E2 are partitioned to both of nodes 1 and 2. In the example of Table 3, event E3 is partitioned to node 1 because both the grid cell of its location and all the adjacent cells are partitioned to node 1; likewise, event E4 is partitioned to node 2.

TABLE 3

Map of events to processing nodes

| Time | Event | Processing nodes |
|------|-------|------------------|
| T0   | E1    | 1, 2             |
| T0   | E2    | 1, 2             |
| T0   | E3    | 1                |
| T0   | E4    | 2                |

Based on the partitioning of events as in Table 3, the system then sends the events to the respective processing nodes or cores. The processing nodes apply the spatial functions (e.g., distance and withinDistance) to the received events. In the example of Table 4, the processing nodes can apply the spatial function on each pairwise combination of the received events. In some embodiments, the system can apply a spatial function to other combinations, such as triplets of events, and is not limited by the present disclosure.

Accordingly, each processing node can send its output including the result of its computations to a master or head node. The master or head node can then combine the partition results into a single result of the spatial function. In the example of Table 4, the master node can combine the spatial functions computed for different combinations of events from each partition including the proximity for all nearby pairs of events.

TABLE 4

Output from processing nodes

| Time | Processing Node | Events     | Output (proximity) |
|------|-----------------|------------|--------------------|
| T0   | 1               | E1, E2, E3 | P (E1, E2)         |
|      |                 |            | P (E1, E3)         |
|      |                 |            | P (E2, E3)         |
| T0   | 2               | E1, E2, E4 | P (E1, E2)         |
|      |                 |            | P (E1, E4)         |
|      |                 |            | P (E2, E4)         |

Some redundant output is possible since the system replicates some events to multiple processing nodes so that the system does not miss proximity of any nearby events. In the example of Table 4, the proximity P(E1,E2) between events E1 and E2 is computed by both nodes 1 and 2. Such redundant output can be removed by a duplicate detection technique as a follow up step. Another approach to handle the duplicates is to flag a respective event as "primary" on the node to which its location geohash is partitioned, and as "secondary" on nodes to which its adjacent grid cells' geohashes are partitioned. The processing nodes can then use this flag to avoid calculating the proximity for events flagged as secondary.

Process for Distributed Geospatial Computation

Figure 3:
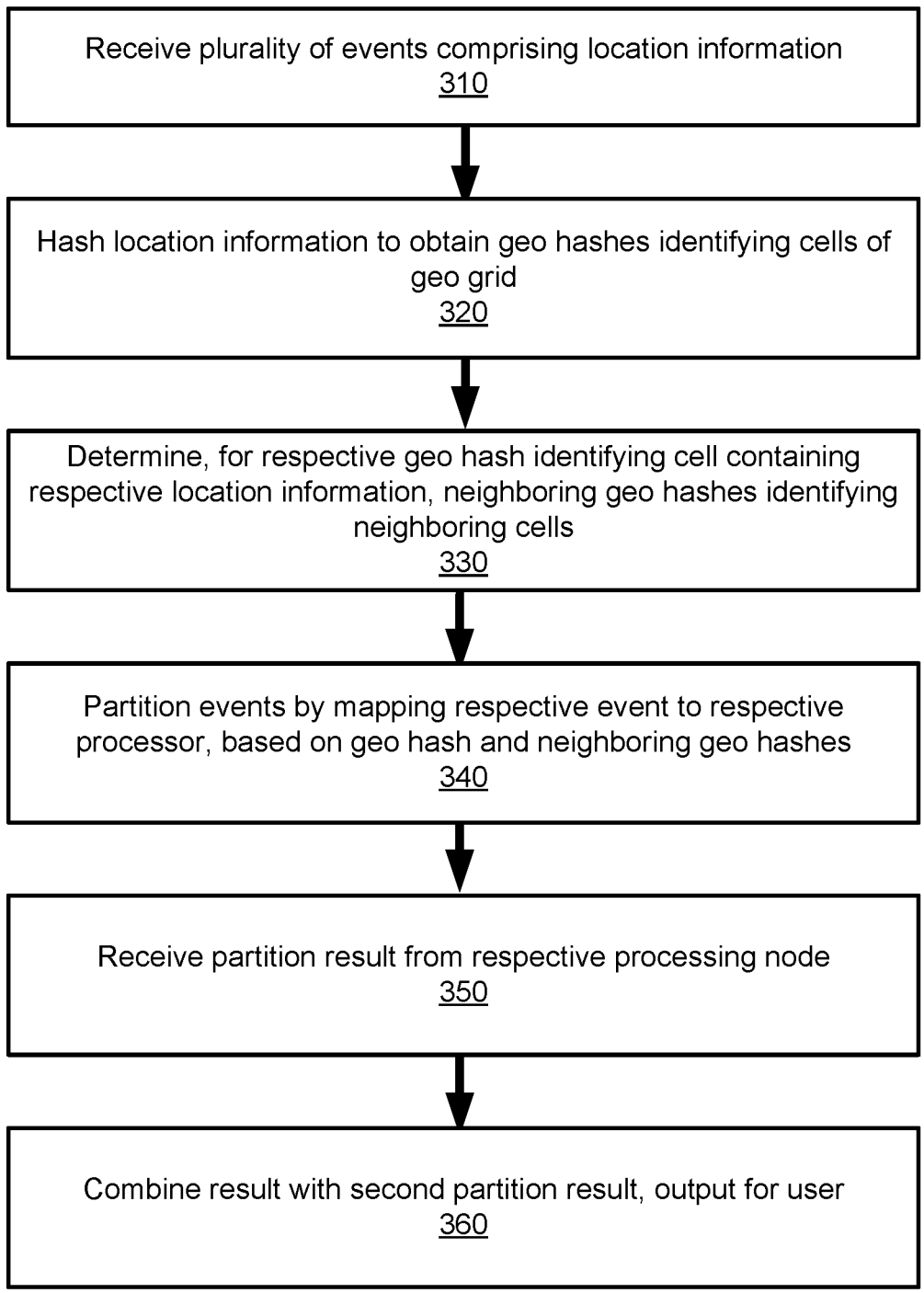
FIG. 3 is an example flow diagram of a distributed geospatial computation process, in accordance with an embodiment.

FIG. 3 is an example flow diagram of a distributed geospatial computation process 300, in accordance with an embodiment. In various embodiments, the processes depicted in FIG. 3 may be implemented by an event processing system as in the examples of FIGS. 5-8 below, or by another server, computing device, or system. At operation 310, the system can receive a plurality of events, the events comprising location information. For example, the events can be part of a stream and can include timestamped events such as a GPS location of one or more moving objects, traffic information, a speed and direction of motion, etc.

At operation 320, the system hashes the location information of the events to obtain geo hashes identifying cells in a geo grid, a respective identified cell containing respective location information of a respective event. For example, a shorter prefix of the geocode or geo hash can expand to a group of nearby grid cells, while a full-length geocode or geohash can identify a single grid cell. In an embodiment, the grid cells can correspond to partitions that can be used to distribute the events to multiple processing elements, such as nodes or cores in a computing cluster, as in operation 340 below.

In an embodiment, the system can obtain a cutoff distance for applications of the spatial function. For example, the cutoff distance can be specified by a user, and can be used to restrict the system to computing the spatial function for event locations within the cutoff distance from each other. The system can then determine a size of the cells of the geo grid, based at least in part on the obtained cutoff distance, and can space the geo grid based at least in part on the determined size. For example, the system can use a grid cell size substantially equal to the cutoff distance, so that the spatial function only needs to be computed for events located in adjacent cells, as in the example of Table 4.

At operation 330, the system then determines, for a respective geo hash that identifies the respective cell containing the respective location information, a respective set of neighboring geo hashes identifying neighboring cells in the geo grid. In an embodiment, the respective set of nearby geo hashes comprises eight geo hashes identifying cells adjacent to the respective cell. In particular, the system can identify the adjacent cells when the cell size has been determined based on the cutoff distance, e.g., when the cell size has been set equal to the cutoff distance. In some embodiments, the system can identify a different set of neighboring cells.

At operation 340, the system then partitions the plurality of events by mapping, based on the respective geo hash and the respective set of neighboring geo hashes, the respective event to a respective processor of a plurality of distributed processors. In an embodiment, the cells or partitions can be mapped to processing elements, such as nodes or cores of a cluster, based on a modulus operation, a division operation, a load balancing function, a partitioning function, or another custom function.

At operation 350, the system then receives an output result from the respective processor identifying a respective partition result of the geospatial computation. In an embodiment, the partition result of the geospatial computation can correspond to an application of a spatial function on input comprising the respective location and second location of a second event. For example, the spatial function can return a proximity of the respective location information and the second location information. At operation 360, the system then combines the respective partition result with a second partition result to obtain a single result corresponding to the geospatial computation. In an embodiment, when combining the respective partition result with the second partition result, the system can detect duplicate computations of the spatial function, i.e. multiple computations of the same spatial function (by different nodes) using the same events and/or location information as input. The system can filter out or discard such redundant results. Alternatively, the system can flag a respective event as "primary" on the node to which its location geohash is partitioned, and as "secondary" on nodes to which its adjacent grid cells' geohashes are partitioned. The processing nodes can then use this flag to avoid calculating the proximity for events flagged as secondary.

Finally, the system can further output the single result corresponding to the geospatial computation for a user.

Figure 4A:
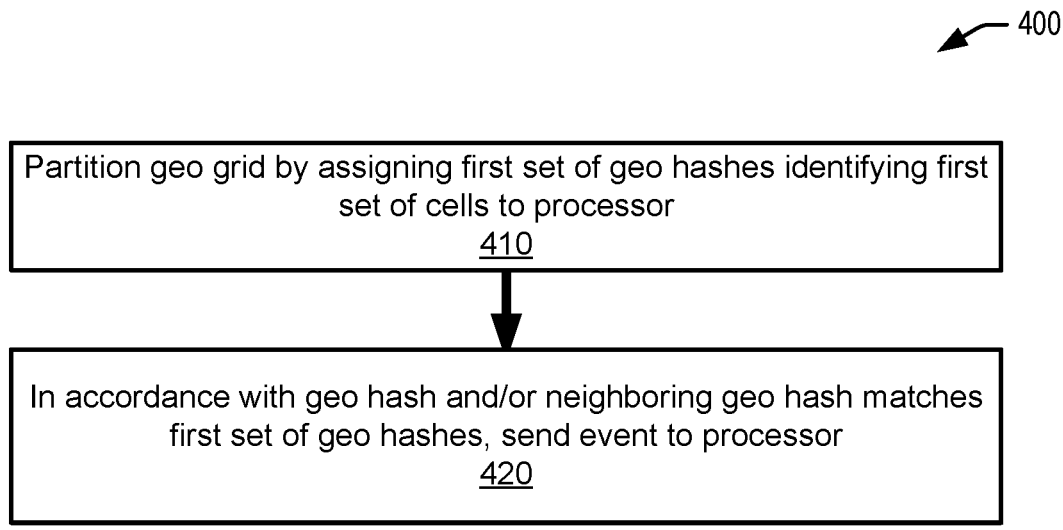
FIG. 4A is an example flow diagram of an event partitioning process, in accordance with an embodiment.

FIG. 4A is an example flow diagram of an event partitioning process 400, in accordance with an embodiment. The processes depicted in FIG. 4A can provide further detail on partitioning the plurality of events, as in operation 340 of the example of FIG. 3. In various embodiments, the processes depicted in FIG. 4A may be implemented by an event processing system as in the examples of FIGS. 5-8 below, or by another server, computing device, or system. At operation 410, the system can partition the geo grid by assigning a first set of geo hashes identifying a first set of cells in the geo grid to the respective processor. The system can map the geo hashes to the respective processing nodes or cores based on a modulus operation, a division operation, a load balancing function, a partitioning function, or another custom function. For example, a contiguous or neighboring group of cells or hashes can be sent to a single processing node.

At operation 420, in accordance with a determination that the respective geo hash and/or a second geo hash in the respective set of neighboring geo hashes matches the first set of geo hashes, the computing device then sends the respective event to the respective processor.

Figure 4B:
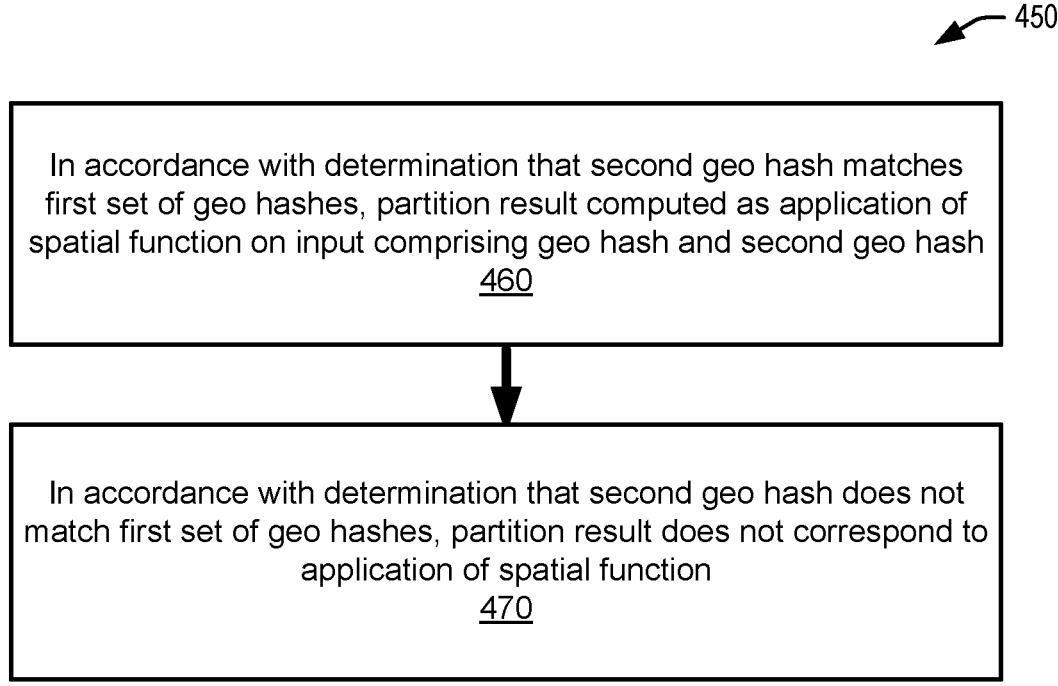
FIG. 4B is an example flow diagram of a process to avoid duplicate computation during event partitioning, in accordance with an embodiment.

As described above, when combining the results across different partitions, the system can filter out a duplicate result of the respective partition result and the second partition result. Alternatively, the system can prevent the different partitions from computing redundant results, by identifying events as "primary" or "secondary" according to whether their locations are within or adjacent to the partitioned grid ranges, respectively. In an embodiment, the system can send a flag representing this classification to the processing nodes or cores together with each event. The processing nodes can then use the classification to avoid calculating the spatial function for events identified as secondary. FIG. 4B is an example flow diagram of a process 450 to avoid duplicate computation during event partitioning, in accordance with an embodiment. The processes depicted in FIG. 4B may be implemented by event processing systems such as in the examples of FIGS. 5-8 below or by another server, computing device, or system. At operation 460, in accordance with a determination by the respective processor that the second geo hash matches the first set of geo hashes, the partition result of the geospatial computation is computed, by the respective processor, as an application of a spatial function on input comprising the respective geo hash and the second geo hash. Alternatively, at operation 470, in accordance with a determination by the respective processor that the second geo hash does not match the first set of geo hashes, the partition result of the geospatial computation is not computed as the application of the spatial function on the input comprising the respective geo hash and the second geo hash.

In various embodiments, the processing nodes or cores can use different approaches to determine when a computation is redundant. In an embodiment, the system may calculate the spatial function only when both events are marked primary on the node. Thus, in the example of Table 4, instead of computing P(E1, E2) on both of nodes 1 and 2 as shown, the system could compute P(E1, E2) on node 1, where both events are marked primary, and not on node 2, where both events are secondary, thereby avoiding the redundancy. Alternatively, the system can perform the computation only when a specific one of the events is marked primary (e.g., the event with the lowest event identifier number or earliest timestamp). In the example of Table 4, since event E1 has a lower event identifier number than event E2, and event E1 is primary on node 1, P(E1, E2) can be computed by node 1 and not by node 2. In another example, the system can calculate the spatial function when either event is marked primary on the node.

Illustrative Systems

Figure 5:
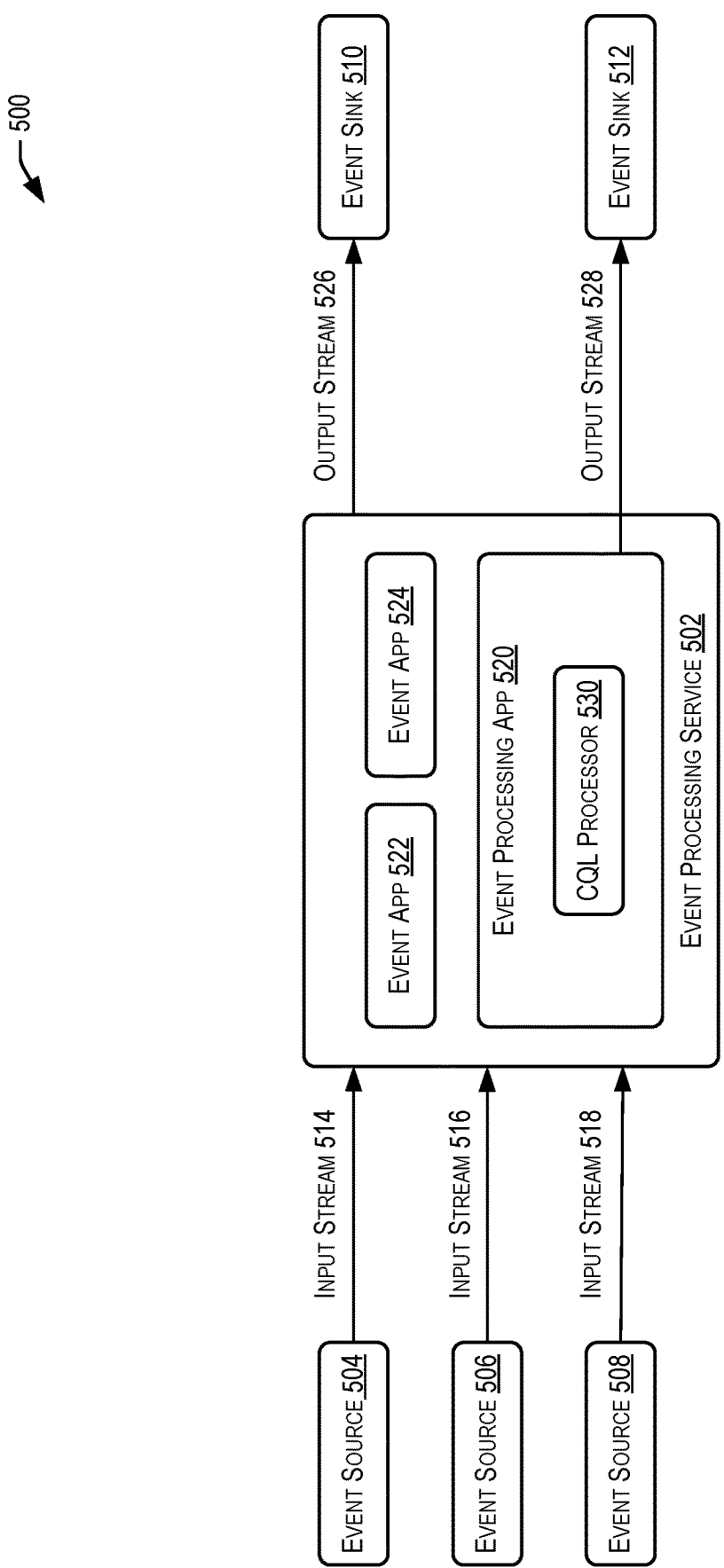
FIG. 5 is an illustration of a simplified high level diagram of an event processing system in accordance with an embodiment of the present disclosure.

FIGS. 5-8 illustrate aspects of example environments for implementing aspects of the present disclosure in accordance with various embodiments. FIG. 5 depicts a simplified high level diagram of an event processing system 500 that may incorporate an embodiment of the present disclosure. Event processing system 500 may comprise one or more event sources (504, 506, 508), an event processing service (EPS) 502 (also referred to as CQ Service 502) that is configured to provide an environment for processing event streams, and one or more event sinks (510, 512). The event sources generate event streams that are received by EPS 502. EPS 502 may receive one or more event streams from one or more event sources. For example, as shown in FIG. 5, EPS 502 receives a first input event stream 514 from event source 504, a second input event stream 516 from event source 506, and a third event stream 518 from event source 508. One or more event processing applications (520, 522, and 524) may be deployed on and be executed by EPS 502. An event processing application executed by EPS 502 may be configured to listen to one or more input event streams, process the events received via the one or more event streams based upon processing logic that selects one or more events from the input event streams as notable events. The notable events may then be sent to one or more event sinks (510, 512) in the form of one or more output event streams. For example, in FIG. 5, EPS 502 outputs a first output event stream 526 to event sink 510, and a second output event stream 528 to event sink 512. In certain embodiments, event sources, event processing applications, and event sinks are decoupled from each other such that one can add or remove any of these components without causing changes to the other components.

In one embodiment, EPS 502 may be implemented as a Java server comprising a lightweight Java application container, such as one based upon Equinox OSGi, with shared services. In some embodiments, EPS 502 may support ultra-high throughput and microsecond latency for processing events, for example, by using JRockit Real Time. EPS 502 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query)

for selecting one or more notable events from the one or more input event streams, and output the selected notable events to one or more event sources via one or more output event streams. FIG. 5 provides a drilldown for one such event processing application 520. As shown in FIG. 5, event processing application 520 is configured to listen to input event stream 518, execute a continuous query 530 comprising logic for selecting one or more notable events from input event stream 518, and output the selected notable events via output event stream 528 to event sink 512. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 520 in FIG. 5 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 502 without having to store all the received events data. Accordingly, EPS 502 provides a special querying mechanism that enables processing of events to be performed as the events are received by EPS 502 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 502 for a particular event stream may be executed each time that an event is received in that event stream. As part of the continuous query execution, EPS 502 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 500 depicted in FIG. 5 may have other components than those depicted in FIG. 5. Further, the embodiment shown in FIG. 5 is only one example of a system that may incorporate an embodiment of the present disclosure. In some other embodiments, system 500 may have more or fewer components than shown in FIG. 5, may combine two or more components, or may have a different configuration or arrangement of components. System 500 can be of various types including a service provider computer, a personal computer, a portable device (e.g., a mobile telephone or device), a workstation, a network computer, a mainframe, a kiosk, a server, or any other data processing system. In some other embodiments, system 500 may be configured as a distributed system where one or more components of system 500 are distributed across one or more networks in the cloud.

The one or more of the components depicted in FIG. 5 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 6:
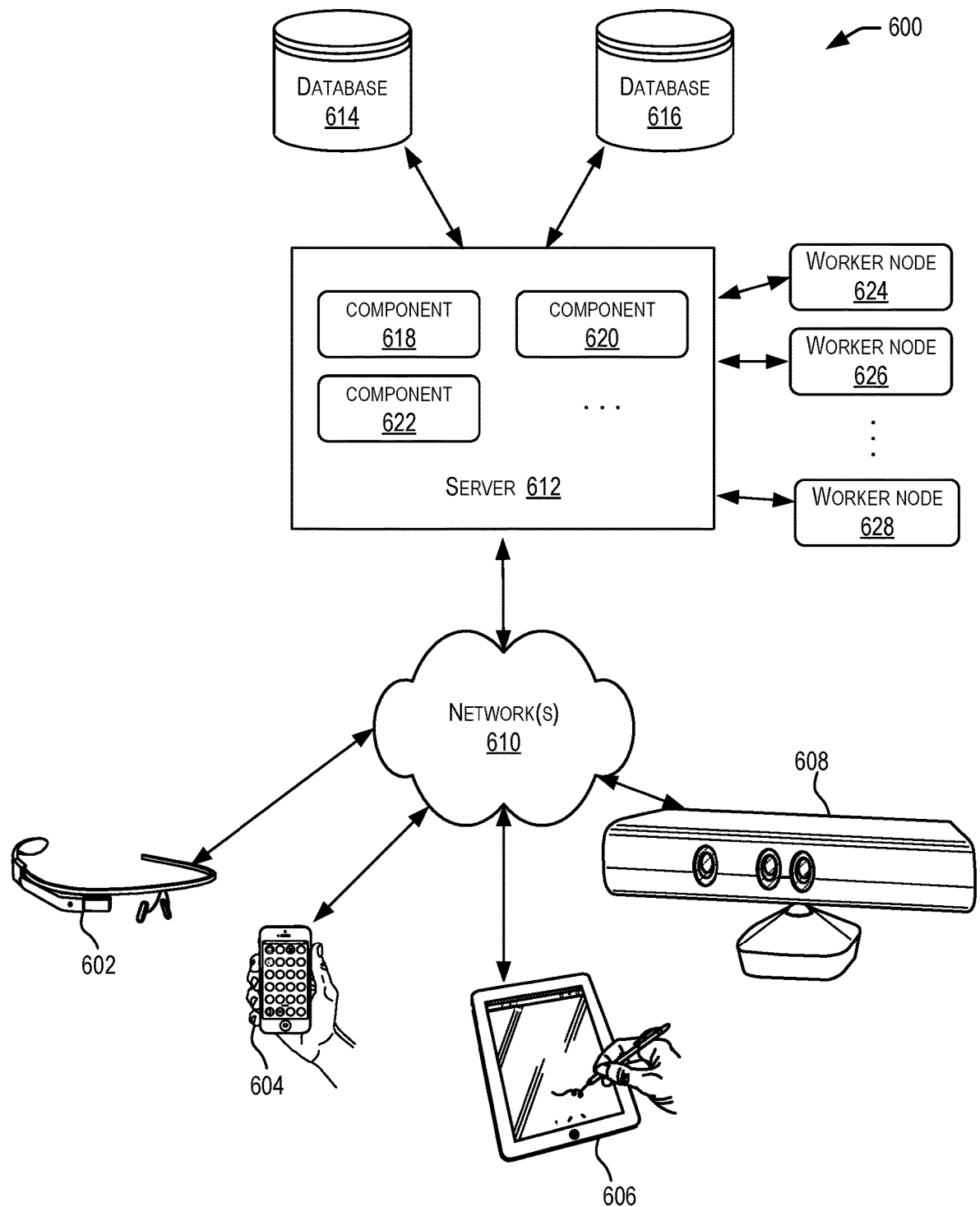
FIG. 6 depicts a simplified diagram of a distributed system for implementing an embodiment of the present disclosure.

FIG. 6 depicts a simplified diagram of a distributed system 600 for implementing an embodiment of the present disclosure. In the illustrated embodiment, the distributed system 600 includes one or more client computing devices 602, 604, 606, and 608, which are configured to execute and operate a client application such as a web browser, proprietary client (e.g., Oracle Forms), or the like over one or more network(s) 610. The server 612 may be communicatively coupled with the remote client computing devices 602, 604, 606, and 608 via network 610.

In various embodiments, the server 612 may be adapted to run one or more services or software applications such as services and applications that provide identity management services. In certain embodiments, the server 612 may also provide other services or software applications can include non-virtual and virtual environments. In some embodiments, these services may be offered as web-based or cloud services or under a Software as a Service (SaaS) model to the users of the client computing devices 602, 604, 606, and/or 608. Users operating the client computing devices 602, 604, 606, and/or 608 may in turn utilize one or more client applications to interact with the server 612 to utilize the services provided by these components.

In the configuration depicted in FIG. 6, the software components 618, 620 and 622 of system 600 are shown as being implemented on the server 612. In other embodiments, one or more of the components of the system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

The client computing devices 602, 604, 606, and/or 608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 610.

Although distributed system 600 in FIG. 6 is shown with four client computing devices, any number of client computing devices may be supported. Other devices, such as devices with sensors, etc., may interact with the server 612.

The network(s) 610 in the distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 612 can include one or more virtual machines running virtual operating systems, or other computing architectures involving virtualization. One or more flexible pools of logical storage devices can be virtualized to maintain virtual storage devices for the server. Virtual networks can be controlled by the server 612 using software defined networking. In various embodiments, the server 612 may be adapted to run one or more services or software applications described in the foregoing disclosure. For example, the server 612 may correspond to a server for performing processing as described above according to an embodiment of the present disclosure.

The server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 612 may include one or more applications to analyze and consolidate data feeds and/or event updates received from users of the client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 612 may also include one or more applications to display the data feeds and/or real-time events via one or more display devices of the client computing devices 602, 604, 606, and 608.

The distributed system 600 may also include one or more databases 614 and 616. These databases may provide a mechanism for storing information such as user identity information, and other information used by embodiments of the present disclosure. Databases 614 and 616 may reside in a variety of locations. By way of example, one or more of databases 614 and 616 may reside on a non-transitory storage medium local to (and/or resident in) the server 612. Alternatively, the databases 614 and 616 may be remote from the server 612 and in communication with the server 612 via a network-based or dedicated connection. In one set of embodiments, the databases 614 and 616 may reside in a storage-area network (SAN). Similarly, any necessary files for performing the functions attributed to the server 612 may be stored locally on the server 612 and/or remotely, as appropriate. In one set of embodiments, the databases 614 and 616 may include relational databases, such as databases provided by Oracle, that are adapted to store, update, and retrieve data in response to SQL-formatted commands.

Figure 7:
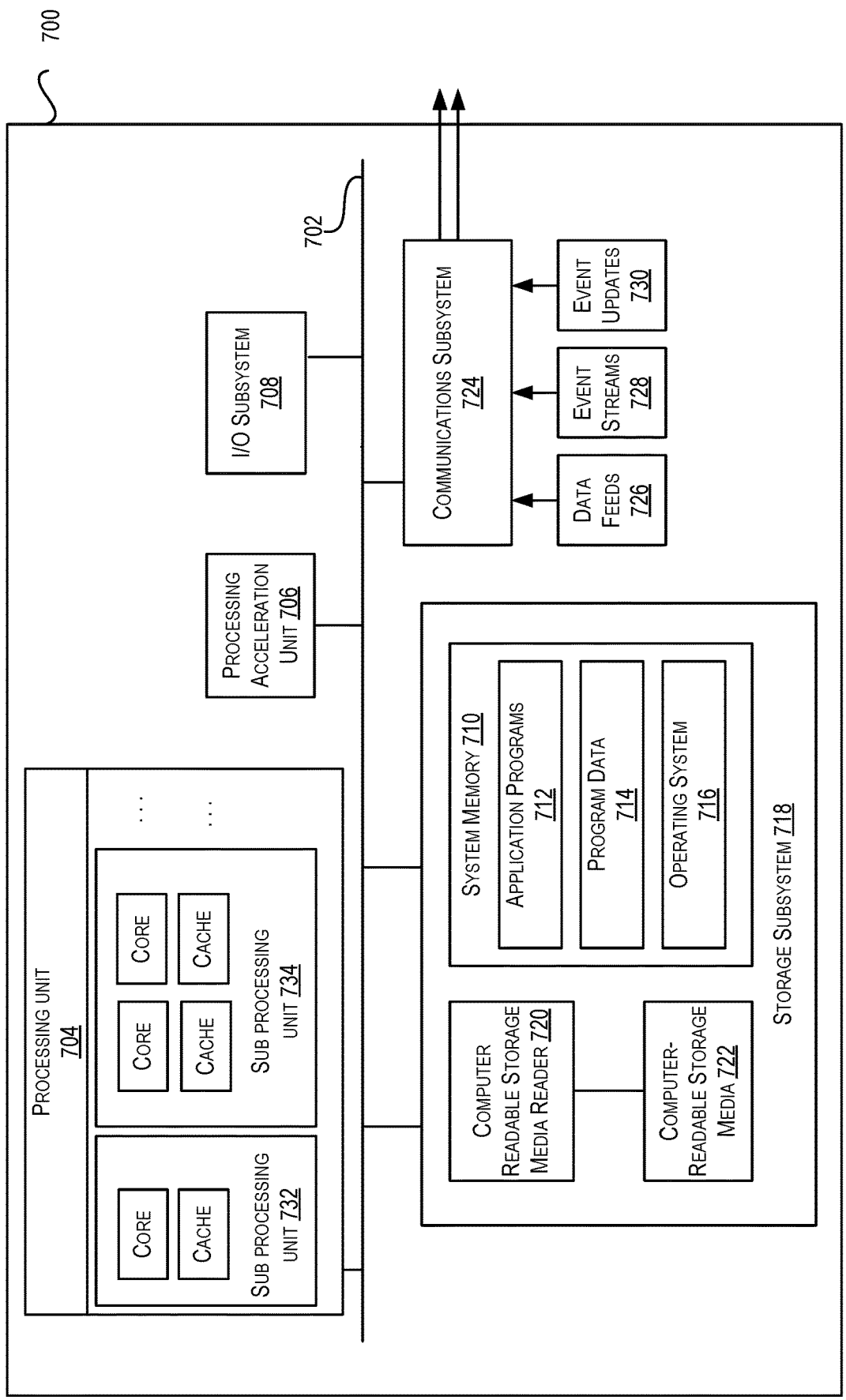
FIG. 7 is a simplified block diagram of one or more components of a system environment by which services provided by one or more components of an embodiment system may be offered as cloud services, in accordance with an embodiment of the present disclosure.

FIG. 7 illustrates an exemplary computer system 700 that may be used to implement an embodiment of the present disclosure. In some embodiments, computer system 700 may be used to implement any of the various servers and computer systems described above. As shown in FIG. 7, computer system 700 includes various subsystems including a processing subsystem 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processing units 732, 734, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 710 including potentially on one or more storage devices. Through suitable programming, processing subsystem 704 can provide various functionalities described above for dynamically modifying documents (e.g., webpages) responsive to usage patterns.

In certain embodiments, a processing acceleration unit 706 may be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with the present disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that when executed by processing subsystem 704 a processor provide the functionality described above may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. Additionally, communication subsystem 724 may be used to communicate notifications of successful logins or notifications to re-enter a password from the privileged account manager to the requesting users.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, communications subsystem 724 may receive input communication in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

Figure 8:
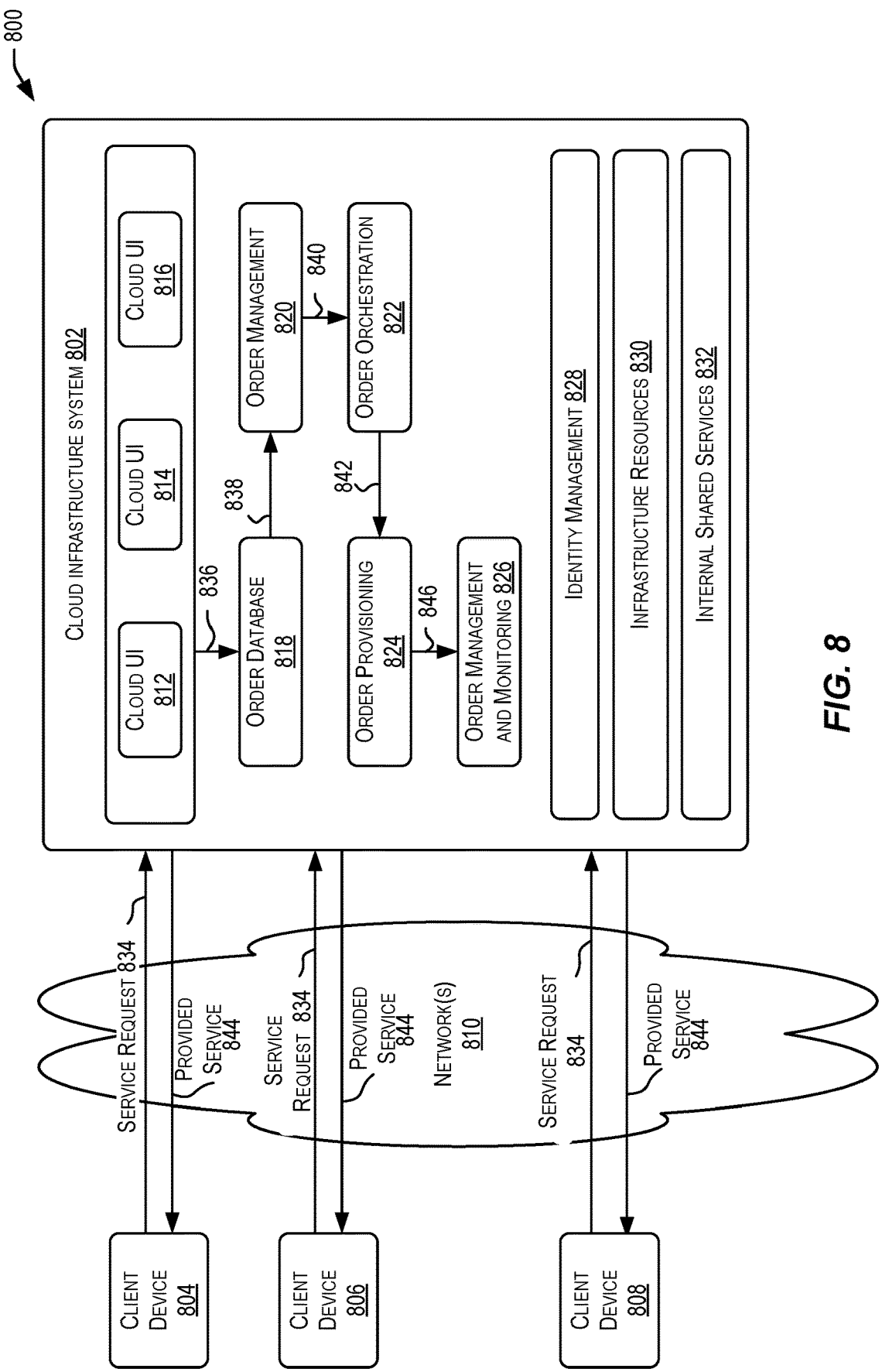
FIG. 8 illustrates an example computer system that may be used to implement an embodiment of the present disclosure.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 602, 604, 606, and 608.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 610.

Cloud infrastructure system 802 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802. At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method for distributing a geospatial computation, comprising:
   receiving, by a computing cluster comprising a server and a plurality of processing nodes wherein at least one of the processing nodes comprise a master processing node, a plurality of events in an event stream comprising location information;
   hashing, by the computing cluster, the location information of the events in the event stream to obtain geo hashes identifying cells in a geo grid, a respective identified cell containing respective location information of a respective event;
   determining, for a respective geo hash that identifies the respective cell containing the respective location information, a respective set of neighboring geo hashes identifying neighboring cells in the geo grid;
   partitioning the plurality of events by mapping, based at least in part on the respective geo hash and the respective set of neighboring geo hashes, the respective event to a respective processing node of the plurality of processing nodes;
   obtaining a cutoff distance for applications of a spatial function;
   determining a size of the cells in the geo grid, based at least in part on the obtained cutoff distance;
   spacing the geo grid based at least in part on the determined size; and
   processing the events associated with a grid cell and all adjacent grid cells by one of the plurality of processing nodes;
   receiving, by the master processing node, an output result from the respective processor identifying a respective partition result of a geospatial computation, the respective partition result of the geospatial computation corresponding to a partition application of the spatial function to process input comprising the respective location information and second location information of a second event;
   combining, by the master processing node, the respective partition result with a second partition result to obtain a single result corresponding to the geospatial computation; and
   outputting the single result corresponding to the geospatial computation for a user, the single result being a spatial result.

2. The method of claim 1, wherein the spatial function returns a proximity of the respective location information and the second location information.

3. The method of claim 1, wherein partitioning the plurality of events further comprises:
   partitioning the geo grid by assigning a first set of geo hashes identifying a first set of cells in the geo grid to the respective processor; and
   in accordance with a determination that the respective geo hash and/or a second geo hash in the respective set of neighboring geo hashes matches the first set of geo hashes, sending the respective event to the respective processor.

4. The method of claim 3, wherein:
   in accordance with a determination by the respective processor that the second geo hash matches the first set of geo hashes, the partition result of the geospatial computation is computed, by the respective processor, as an application of a spatial function on input comprising the respective geo hash and the second geo hash; and
   in accordance with a determination by the respective processor that the second geo hash does not match the first set of geo hashes, the partition result of the geospatial computation is not computed as the application of the spatial function on the input comprising the respective geo hash and the second geo hash.

5. The method of claim 1, wherein the respective set of neighboring geo hashes comprises eight geo hashes identifying cells adjacent to the respective cell.

6. The method of claim 1, wherein combining the respective partition result with the second partition result further comprises filtering out a duplicate result of the respective partition result and the second partition result using a continuous query.

7. The method of claim 1 wherein combining, by the master processing node, the respective partition result with a second partition result further comprises:
   determining, by the master processing node, that a first event and a second event from the event stream are duplicate events, according to respective locations of the first and second event, wherein the first event is associated with the identified respective cell and the second event is associated with an adjacent respective cell;
   determining, by the master processing node, that the first event is a primary event and the second event is a secondary event;
   sending, by the master processing node, to a first processing node of the plurality of processing nodes, a first signal causing the first processing node to calculate a spatial function for the primary event; and
   sending, by the master processing node, to the second processing node of the plurality of processing nodes, a second signal causing the second processing node to ignore the secondary event.

8. The method of claim 1 wherein the computing cluster further comprises an event processing service, the method further comprising:
   receiving, by the event processing service, one or more event streams;
   determining, by the event processing service, using a continuous query that a first event in at least one of the event streams is a notable event; and
   outputting, by the event processing service, to the server a filtered event stream comprising only notable events.

9. A system for distributing a geo spatial computation, comprising:
   a memory configured to store computer-executable instructions; and
   one or more processors configured to access the memory and execute the computer-executable instructions to at least:
      receive, by a computing cluster comprising a server and a plurality of processing nodes wherein at least one of the processing nodes comprise a master processing node, a plurality of events in an event stream comprising location information;

hash, by the computing cluster, the location information of the events to obtain geo hashes identifying cells in a geo grid, a respective identified cell containing respective location information of a respective event;

determining, for a respective geo hash that identifies the respective cell containing the respective location information, a respective set of neighboring geo hashes identifying neighboring cells in the geo grid;

partitioning the plurality of events by mapping, based at least in part on the respective geo hash and the respective set of neighboring geo hashes, the respective event to a respective processing node of the plurality of processing nodes;

obtaining a cutoff distance for applications of a spatial function;

determining a size of the cells in the geo grid, based at least in part on the obtained cutoff distance;

spacing the geo grid based at least in part on the determined size; and processing the events associated with a grid cell and all adjacent grid cells by one of the plurality of processing nodes;

receiving, by a master processing node of the one or more processors, an output result from the respective processor identifying a respective partition result of a geospatial computation, the respective partition result of the geospatial computation corresponding to a partition application of the spatial function to process input comprising the respective location information and second location information of a second event;

combining, by the master processing node, the respective partition result with a second partition result to obtain a single result corresponding to the geospatial computation; and outputting the single result corresponding to the geospatial computation for a user, the single result being a spatial result.

10. The system of claim 9, wherein the spatial function returns a proximity of the respective location information and the second location information.

11. The system of claim 9, wherein while partitioning the plurality of events, the processor further performs:

partitioning the geo grid by assigning a first set of geo hashes identifying a first set of cells in the geo grid to the respective processor; and in accordance with a determination that the respective geo hash and/or a second geo hash in the respective set of neighboring geo hashes matches the first set of geo hashes, sending the respective event to the respective processor.

12. The system of claim 11, wherein:

in accordance with a determination by the respective processor that the second geo hash matches the first set of geo hashes, the partition result of the geospatial computation corresponds is computed, by the respective processor, as an application of a spatial function on input comprising the respective geo hash and the second geo hash; and in accordance with a determination by the respective processor that the second geo hash does not match the first set of geo hashes, the partition result of the geospatial computation is not computed as the application of the spatial function on the input comprising the respective geo hash and the second geo hash.

13. The system of claim 9, wherein while combining the respective partition result with the second partition result, the processor further performs filtering out a duplicate result of the respective partition result and the second partition result using a continuous query.

14. A non-transitory computer-readable medium storing computer-executable code that, when executed by one or more processors for distributing a geospatial computation, cause the processor to perform operations comprising:

receiving, by a computing cluster comprising a server and a plurality of processing nodes, wherein at least one of the processing nodes comprises a master processing node, a plurality of events in an event stream comprising location information;

hashing, by the computing cluster, the location information of the events to obtain geo hashes identifying cells in a geo grid, a respective identified cell containing respective location information of a respective event;

determining, for a respective geo hash that identifies the respective cell containing the respective location information, a respective set of neighboring geo hashes identifying neighboring cells in the geo grid;

partitioning the plurality of events by mapping, based at least in part on the respective geo hash and the respective set of neighboring geo hashes, the respective event to a respective processing node of the plurality of distributed processing nodes;

obtaining a cutoff distance for applications of a spatial function;

determining a size of the cells in the geo grid, based at least in part on the obtained cutoff distance;

spacing the geo grid based at least in part on the determined size; and processing the events associated with a grid cell and all adjacent grid cells by one of the plurality of processing nodes;

receiving, by a master processing node of the one or more processors, an output result from the respective processor identifying a respective partition result of a geospatial computation, the respective partition result of the geospatial computation corresponding to a partition application of the spatial function to process input comprising the respective location information and second location information of a second event;

combining, by the master processing node, the respective partition result with a second partition result to obtain a single result corresponding to the geospatial computation; and outputting the single result corresponding to the geospatial computation for a user, the single result being a spatial result.

15. The non-transitory computer-readable medium of claim 14, wherein while partitioning the plurality of events, the processor further performs:

partitioning the geo grid by assigning a first set of geo hashes identifying a first set of cells in the geo grid to the respective processor; and in accordance with a determination that the respective geo hash and/or a second geo hash in the respective set of neighboring geo hashes matches the first set of geo hashes, sending the respective event to the respective processor.

16. The non-transitory computer-readable medium of claim 14, wherein while combining the respective partition result with the second partition result, the processor further performs filtering out a duplicate result of the respective partition result and the second partition result using a continuous query.

17. The non-transitory computer-readable medium of claim 14, wherein while partitioning the plurality of events, the processor further performs:

determining, by the master processing node, that a first event and a second event from the event stream are duplicate events, according to respective locations of the first and second event, wherein the first event is associated with the identified respective cell and the second event is associated with an adjacent respective cell;

determining, by the master processing node, that the first event is a primary event and the second event is a secondary event;

sending, by the master processing node, to a first processing node of the plurality of processing nodes, a first signal causing the first processing node to calculate a spatial function for the primary event; and sending, by the master processing node, to the second processing node of the plurality of processing nodes, a second signal causing the second processing node to ignore the secondary event.

* * * * *